US006389404B1

(12) United States Patent
Carson et al.

(10) Patent No.: US 6,389,404 B1
(45) Date of Patent: *May 14, 2002

(54) NEURAL PROCESSING MODULE WITH INPUT ARCHITECTURES THAT MAKE MAXIMAL USE OF A WEIGHTED SYNAPSE ARRAY

(75) Inventors: John C. Carson, Corona Del Mar; Christ H. Saunders, Laguna Niguel, both of CA (US)

(73) Assignee: Irvine Sensors Corporation, Costa Mesa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,476

(22) Filed: Dec. 30, 1998

(51) Int. Cl.$^7$ .............................. G06F 15/18; G06G 7/00
(52) U.S. Cl. ............................... 706/18; 709/20; 709/38
(58) Field of Search ............................. 706/18, 20, 38

(56) References Cited

U.S. PATENT DOCUMENTS

| 5,089,983 A | | 2/1992 | Chiang ........................ 708/838 |
| 5,258,934 A | | 11/1993 | Agranat et al. ................. 708/7 |
| 5,299,286 A | | 3/1994 | Imondi et al. ................. 706/37 |
| 5,515,477 A | * | 5/1996 | Sutherland .................... 706/41 |
| 5,519,811 A | | 5/1996 | Yoneda et al. ................. 706/33 |

OTHER PUBLICATIONS

Fast Multiplication: Algorithms and Implementation, by Gary W. Bewick, Technical Report No. CSL-TR-94-617, Apr. 1994, Computer Systems Laboratory, Departments of Electrical Engineering and Computer Science, Stanford University, California.
Electronic Hardware, Implementations of Neural Networks, by A. P. Thakoor et al., Applied Optics, vol. 26, No. 23, Dec. 1, 1987.

Neurocomputing: Picking The Human Brain, by Robert Hecht–Nielsen, pp. 4–13, 4–14 and 4–16.
Low Power Analog Neurosynapse Chips for A 3–D "Sugarcube" Neuroprocessor—Duong, T.; Kemeny, S.; Tran,M.; David, T.; Thakoor A.; Ludwig, D.; Saunders, C.; Carson, J. Center for Space Microelectronics Technol., California Inst. Of Technol., Pasadena, CA, USA This paper appears in: Neural Networks, 1994. IEEE World Congress on Computational Intelligence., 1994 IEEE International Conference on pages: 1907–1911 vol. E, 27 Jun–2 Jul. 1994.
Programmable Analog Vector–Matrix Multipliers—Kub, F.J.; Moon, K.K.; Mack, I.A.; Long, F.M. US Naval Res. Lab., Washington, DC, USA. This paper appears in: Solid–State Circuits IEEE Journal of On Pages: 207–214, Feb. 1990, vol. 25 Issue: 1.
WSI Architecture of a Neurocomputer Module—Ramacher, U.; Wesseling, M.; Goser, K. Editors: Brewer, J., Little, M.J. Siemens AG, Corporate Res. & Dev., Munich, West Germany. This paper appears in: Waffer Scale Integration, 1990. Proceedings., [$2^{nd}$] International Conference on On pages 124–130, 23–25 Jan. 1990.
A 16/SPL Times/16 Nonvolatile Programmable Analog Vector–Matrix Multiplier—Aslam–Siddiqi, A.; Brockherde, W.; Hosticka, B.J. Fraunhofer Inst. Of Microelectron Circuits & Syst., Duisburg, Germanny. This paper appears in: Solid–State Circuits, IEEE Journal of On pages 1502–1509, Oct. 1998, vol.: 33 Issue: 10.

* cited by examiner

Primary Examiner—George Davis
(74) Attorney, Agent, or Firm—Joseph C. Andras; Myers, Dawes & Andras LLP (57) ABSTRACT

A neural processing module is disclosed which combines a weighted synapse array that performs "primitive arithmetic" (products and sums) in parallel with a weight change architecture and a data input architecture that collectively maximize the use of the weighted synapse array by providing it with signal permutations as frequently as possible. The neural processing module is used independently, or in combination with other modules in a planar or stacked arrangement.

17 Claims, 5 Drawing Sheets

NEURAL PROCESSING MODULE WITH INPUT ARCHITECTURES THAT MAKE MAXIMAL USE OF A WEIGHTED SYNAPSE ARRAY

BACKGROUND OF THE INVENTION

1. Field of the Invention

The present invention relates generally to electronic neural networks and, more particularly, to a neural processing module that preferably resides on a single "chip" and which achieves high computation rates (usually defined as the number of floating point operations per second), which operates relatively fast, but consume relatively little power and occupies relatively little space, which may be scaled in a planar or massively parallel, stacked arrangement to handle more inputs, achieve greater processing rates, or both, and which achieves its synaptic connections through binary weights that are maintained "off chip" so that the neural processing module may implement a variety of algorithms in different neural network applications.

2. Description of the Prior Art and Related Information

Interest in neural networks has increased because of their theoretical potential to solve problems that are difficult or even impossible to accomplish with conventional computers. Earlier researchers noted, for example, that "[t]he collective behavior of neural network systems has demonstrated useful computation properties for associative memory functions, fault-tolerant pattern recognition, and combinatorial optimization problem solving." A. P. Thakoor, A. Moopenn, J. Lambe, and S. K. Khanna, "Electronic hardware implementations of neural networks," *Applied Optics*, Vol. 26, page 5085, Dec. 1, 1987.

Early neural network research relied on software simulations performed with digital computers based on sequential Von Neuman architectures—"The study of the dynamics, learning mechanisms, and computational properties of neural networks has been largely based on computer software simulations." Id. It has long been recognized, however, that neural network hardware was needed to "provide the basis for development of application-specific architectures for implementing neural network approaches to real-life problems." Id. The many simple, interconnected processors of a neural network implemented in hardware, or electronic neural network, allow for fast parallel processing, but "designing hardware with a large number of processors and high connectivity can be quite difficult." C. Lindsey and T. Lindblad, "Review of Hardware Neural Networks, A User's Perspective." Physics Dept.—Frescati, Royal Institute of Technology Frescativägen 24 104 05 Stockholm, Sweden, 1995.

Electronic neural networks, however, have already been implemented in digital, analog, and hybrid technologies.

Digital architectures are desirable because "digital technology has the advantage of mature fabrication techniques, weight storage in RAM, and arithmetic operation exact within the number of bits of the operands and accumulators. From the users viewpoint, digital chips are easily embedded into most applications. However, digital operations are usually slower than in analog systems, especially in the weight x input multiplication . . . " C. Lindsey and T. Lindblad, id. Processing speed, power consumption, and size (or density) are often critical concerns. These inventors do not know of any digital neural networks that provide sufficiently low power consumption and density to reasonably accomplish the massively parallel processing needed, for example, to perform real-time pattern recognition or feature matching. A single digital neuron is faster than an analog neuron; however, when many digital neurons are combined the size becomes larger and the propagation time between neurons will dominate. Power dissipation is also larger in a digital context.

Analog neurons are smaller and use less power than digital approaches, but are slower and subject to certain complications. For example, "[c]reating an analog synapse involves the complications of analog weight storage and the need for a multiplier [that is] linear over a wide range." C. Lindsey and T. Lindblad, id.

"Hybrid" neural networks combine the "best" of the digital and analog architectures—"Typically, the external inputs/outputs are digital to facilitate integration into digital systems, while internally some or all of the processing is analog." C. Lindsey and T. Lindblad, id. One of the hybrid neural networks discussed in the Lindsey/Lindblad article had 70 analog inputs, 6 hidden layers and 1 analog output with 5-bit digital weights, and achieved a "feed-forward processing rate [of] an astounding 20 ns, representing 20GCPS [Billion Connections Per Second]. . ."

The Thakoor et al. article reference above discusses another hybrid neural network (hereafter "JPL network") which has six neurons and thirty-six synapses and which uses analog inputs and digitally programmable weights. The hybrid architecture of the JPL network allegedly offers a number of advantages by using "high-density random access digital memory to store a large quantity of information associated with the synaptic weights while retaining high-speed analog neurons for the signal processing." Id. at 5089. The authors further note that by using "programmable" synapses, "[t]he hardware requirements and complexity are greatly reduced since the full interconnections of the neurons are no longer required." Id.

The JPL authors recognized that "a hybrid neurocomputer can be easily expanded in size to several hundred neurons." Id. They did not, however, propose any realistic way of implementing a network with thousands of inputs or of implementing a network of any size that makes maximum use of its neurons.

There remains a need, therefore, for a low power, high density, neural processing module which achieves high computation rates, which may be scaled to achieve greater processing rates and to handle more inputs, and which may be used in an electronic neural networks that simplifies the implementation of a particular function by maintaining the weights or synaptic connections "off chip" by using, for example, a chip-in-a-loop arrangement that is controlled by a conventional computer.

SUMMARY OF INVENTION

The present invention resides in a neural processing module which combines a weighted synapse array that performs "primitive arithmetic" (products and sums) with an innovative weight change architecture and an innovative data input architecture which collectively maximize the use of the weighted synapse array. In an image recognition context, the neural processing module dynamically reconfigures incoming image signals against preexisting weights and performs a corresponding successions of convolutions (products and sums) during each image frame.

In more detail, the neural processing module of the present invention achieves extremely high computation rates with lower power and lower area consumption than previously possible by providing a high speed, low power, small geometry array of analog multipliers, and by using such array as continuously as possible. The preferred neural processing module uses its synapse array almost continuously by uniquely combining:

(1) a synapse array of analog synapse cells (e.g. multipliers) and programmable synapses that receives analog data and digital weights and multiplies the analog data by the analog equivalent of the digital weights at a "calculation rate" (e.g. 4 MHz);

(2) a means for rapidly loading the programmable synapses with the digital weights (determined externally, for example, by a microprocessor) at the beginning of each frame and in advance of using the synapse array; and (3) a switching means for receiving frames of periodic input signals at an "arrival rate" that is slower than the calculation rate (e.g. 1000 Hz), for rapidly creating a plurality of input signal permutations from the periodic input signals at a "permutation rate" that is greater than the arrival rate and preferably at or greater than the calculation rate (e.g. 4 MHz), and for feeding each successive input signal permutation to the synapse array at or near the calculation rate.

The invention can be regarded as an electronic neural processing module for convolving a first group of signals with a second group of signals, comprising: means for receiving a first group of signals; switching means for receiving a second group of signals and for creating successive groups of permutated signals from the second group of signals before a next group of second signals arrives; analog multiplying means for simultaneously multiplying each signal in the first group of signals with each signal in each successive group of permutated signals to form a plurality of products; and means for accumulating the plurality of products to produce a convolution output.

The invention can also be regarded as an electronic neural network image recognition system comprising: means for receiving a plurality of weights; means for receiving successive groups of image signals (the image template) at a predetermined frame rate; switching means for creating successive groups of image permutation signals from each group of image signals [the image template] before receiving a subsequent group of image signals; a weighted synapse array of analog synapse cells that simultaneously perform a plurality of calculations at a calculation rate, wherein the calculation rate is greater than the frame rate, the plurality of calculations comprising the multiplying of each weight with each signal in each group of image permutation signals to form a plurality of products; and means for summing the plurality of products to produce a convolution output with a value that represents a correlation quality between the weights and each successive group of image permutation signals.

BRIEF DESCRIPTION OF THE DRAWINGS

The just summarized invention may best be understood with reference to the Figures of which.

DETAILED DESCRIPTION OF THE PREFERRED EMBODIMENTS

Figure 1:
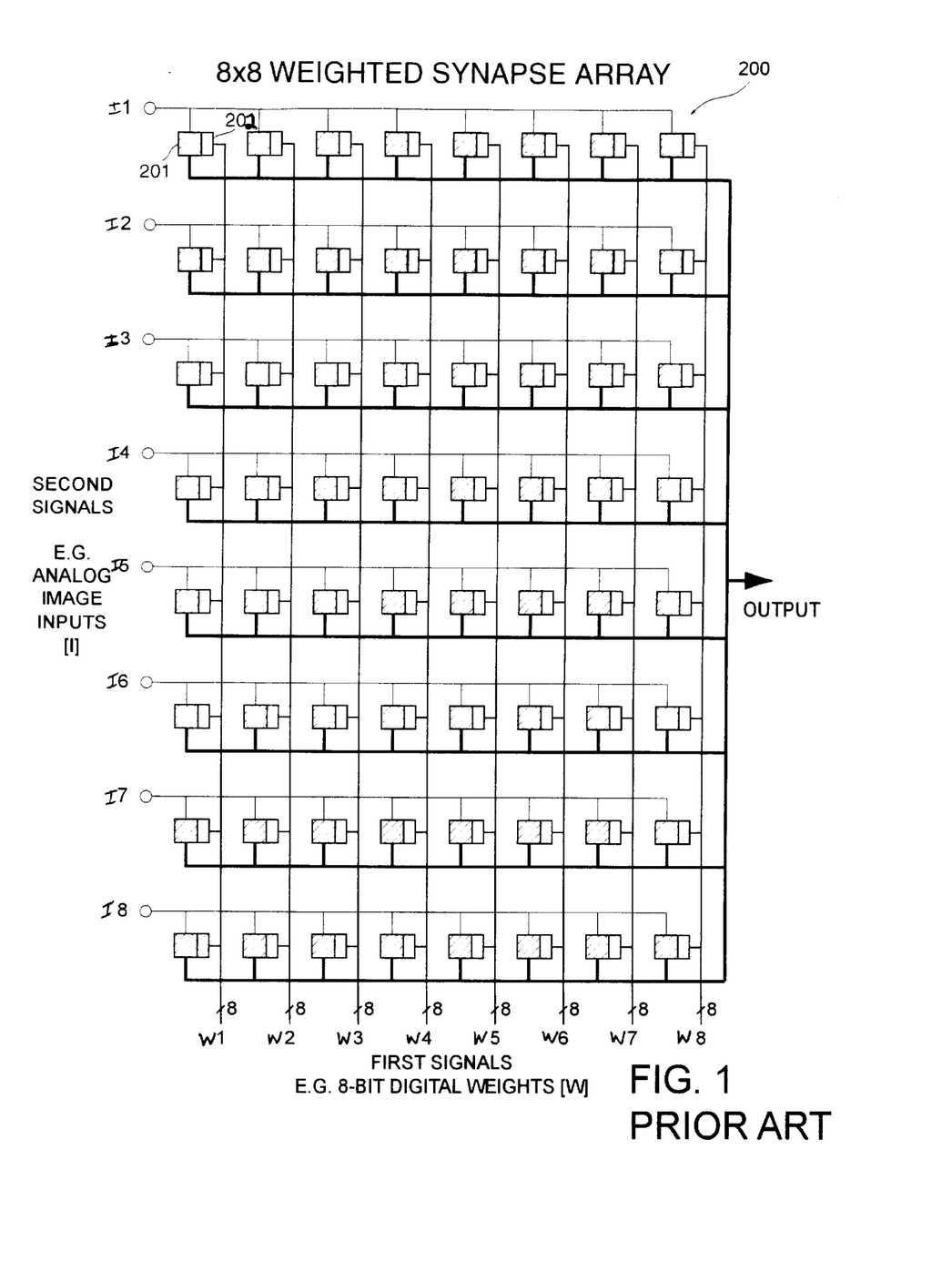
FIG. 1 shows a weighted synapse array 200 that might be used in a neural processing module (NPM) 100 according to the present invention.
Figure 4:
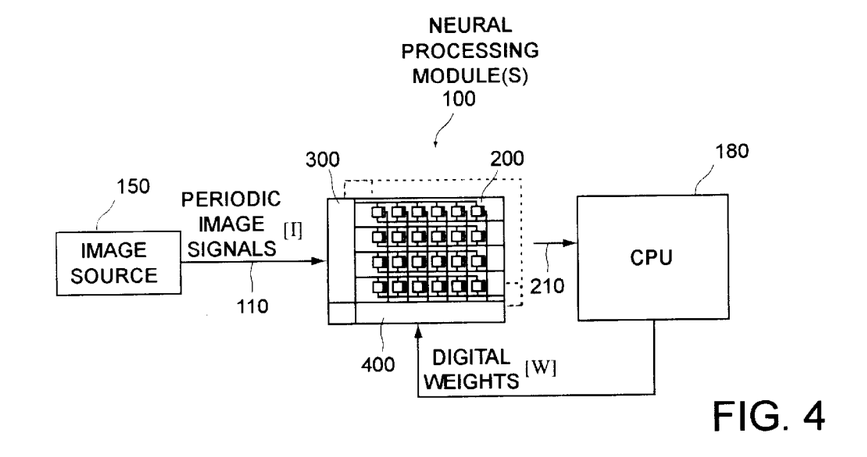
FIG. 4 is a block diagram of a pattern recognition system which uses at least one NPM 100 according to the present invention.

FIG. 1 shows a weighted synapse array 200 that might be used in a neural processing module (hereafter NPM) 100 according to the present invention (see e.g. FIG. 4). The synapse array 200 of FIG. 1 is only 8×8 so that its components and connections are easily understood. The array used in the NPM 100 may be larger or smaller than 8×8. The preferred array 200 is 64×64.

Regardless of its size, the synapse array 200 contains a plurality of synapse cells 201, each of which contains analog circuitry that forms the product of a first signal (e.g. a weight W1, W2, W3, etc. . . . ) and a second signal (e.g. an input signal I1, I2, I3, etc. . . . ). Each synapse cell 201 preferably contains a digital to analog converter (DAC) 202 so that a conventional digital computer maintains the weights "off-chip" and loads the weights into the DACs 202 of the synapse cells 201 as explained further below.

When the DAC 202 of each synapse cell 201 receives a digital weight W1–W8, it converts the digital weight to an analog weight quantity such as charge. When the synapse cell 201 subsequently receives an analog input signal I1–I8, it multiplies the analog input signal by the analog weight quantity, and produces an analog output quantity such as current. The products of the synapse cells 201 are then summed together by ordinary current summation to provide a sum of the products.

As should now be clear, each synapse cell 201 is an analog multiplier and the overall synapse array 200 is a two-dimensional array of analog multipliers whose products (currents) are added together through current summation.

The construction and operation of a weighted synapse array 200 was first disclosed in an article published by researchers from Jet Propulsion Laboratory, entitled "Electronic hardware implementations of neural networks," California Institute of Technology, published in *Applied Optics*, Vol. 26, page 5085, Dec. 1, 1987. The JPL authors recognized that the synapse array 200 could be expanded to "several hundred neurons", but they did not contemplate a neural processing module 100 that combines the synapse array 200 with a unique signal inputting architecture and a unique weight updating architecture that permits the array to have thousands of synapse cells ("neurons") which are used at maximal efficiency.

ANALOG VERSUS DIGITAL

These inventors made critical observations regarding analog and digital multipliers. The first consideration was speed. Here, digital wins because a digital multiplier is generally faster than an analog multiplier. In particular, the synapse cells 201 operate as analog multipliers with a typical latency of about $250 \times 10^{-9}$ seconds (250 nS). By comparison, faster speeds were already being achieved in digital chips that were commercially available in 1988, nearly ten years before this invention:

| Features | MIPS R3010 | Weitek 3364 | TI 8847 |
|---|---|---|---|
| Clock cycle time (ns) | 40 | 50 | 30 |
| Power (watts) | 3.5 | 1.5 | 1.5 |
| Cycles/mult | 5 | 2 | 3 |
| Total mult time (ns) | 200 | 100 | 90 |

Hennessy, John L. & Patterson, David A. 1996 *Computer Architecture A Quantitative Approach*. 2nd ed. San Francisco: Morgan Kaufmann Publishers, Inc., p. A-61.

A reference to more recent technology claims that digital multipliers are available "with a latency of less than 2.6 nanoseconds @ 10.5 Watts and a layout area of 13 mm$^2$." Bewick, Gary W. 1994 "Fast Multiplication: Algorithms and Implementation," Stanford University, Technical Report No. CSL-TR-94-617.

Power consumption is as important an issue as speed. Here, analog multipliers come out ahead of digital multipliers. In particular, a synapse array 200 having 4096 synapse cells 201 only burns about 50 milliwatts, whereas only one (!) of the digital multipliers listed above burns 1.5, 3.5, or 10.5 watts.

Size was the final issue considered. Here again, analog multipliers come out ahead of digital multipliers because the number of FETs required for an 8-bit analog multiplier is 32, and the number of FETs for a digital multiplier is typically 2N+2 registers, where each register requires 20 FETs for a total of 360 FETS for N=8 (additional FETs required for higher speed).

Analog multipliers are slower and apparently undesirable. These inventors determined, however, that analog's speed detriments are outweighed by its relatively larger size and power consumption advantages. An example may help. An analog multiplier that is 10× slower than its digital counterpart, might use 1,000 times less power and occupy 100 times less space. If so, it is possible to construct a massively parallel arrangement of 10× as many analog multipliers that perform the same number of multiplications per second as the smaller number of digital multipliers, but at greatly reduced power (100× less) and space consumption (10× less). The benefits of analog are further enhanced if the synapse array 200 is used as many times as possible between each successive group of periodic input signals.

Analog is clearly desirable (if used according to the present invention), but the data processing world is largely digital. A key concern, therefore, is providing a device with a plurality of analog multipliers that has means for receiving input signals, weights, or both, via a digital interface. These inventors are unaware of any existing technology that has effectively accomplished this feat in the context of a maximally used array.

THE NPM GENERALLY

Figure 2:
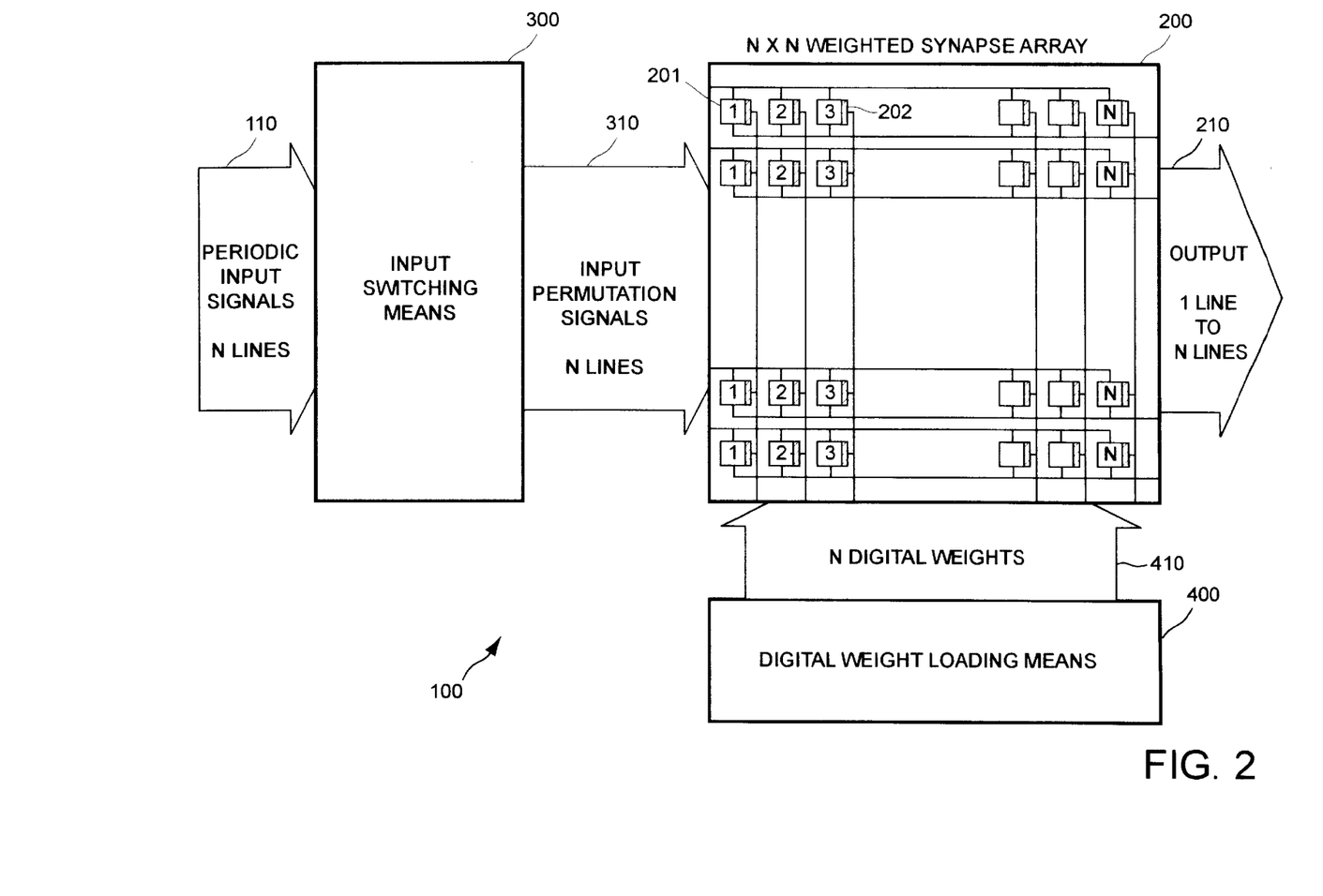
FIG. 2 is a block diagram of a neural processing module (NPM) 100 which makes maximal use of an N×N synapse array 200 according to a preferred embodiment of the present invention.

FIG. 2 is a block diagram of a neural processing module (NPM) 100 which makes maximal use of an N×N synapse array 200 according to a preferred embodiment of the present invention. The NPM 100 generally comprises the synapse array 200, an input switching means 300 that receives periodic input signals 110, and a digital weight loading means 400.

The periodic input signals 110 may be characterized by an "arrival rate" and the synapse array 200 may be characterized by a "calculation rate." These rates are usually very different. For example, the arrival rate of the periodic input signals might be only 30 times per second, or 30 Hz, whereas the calculation rate of the synapse array 200 might be 4,000,000 calculations per second, or 4 MHz.

The present invention takes unique advantage of the disparity between the calculation rate of the synapse array 200 and the arrival rate of the periodic input signals 110. In particular, an NPM 100 according to the present invention repetitively uses the synapse array 200 for each successive group of periodic input signals (often called a "frame") by:

(1) loading N digital weights 410 into the DAC's 202 of the synapse array 200;

(2) rapidly creating a plurality of input signal permutations 310; and (3) providing the synapse array with those input signal permutations 310 prior to the arrival of the next group of period input signals 110.

The input switching means 300 that receives the periodic input signals 110 and creates the signal permutations 310 is any structure that can rearrange the periodic input signals 110 and, preferably, can do so at the calculation rate of the synapse array 200.

The preferred input switching means 300 is a "crossbar" having N inputs that are selectively, simultaneously multiplexed to N outputs at a very fast rate that can "keep up" with the array's calculation rate. A detailed description of crossbars is unnecessary because various arrangements are well known to those of ordinary skill in the art.

The digital weight loading means 400 can be of any desired construct that can rapidly load the digital weights into the DAC's 202 and still provide sufficient time to repetitively use the synapse array 202 with a plurality of permutations 310 before the arrival of the next group of periodic input signals 110.

The output 210 of the synapse array 200 can be anywhere from one line to N lines, depending on whether the output lines are summed together on-chip or off-chip (preferred).

The NPM 100 is beneficially modular such that a system may have only one NPM 100; many NPMs that are provided in a flat, board mounted arrangement, or many NPMs that are provided in a stacked arrangement within a Z-type module comparable to that disclosed in U.S. Pat. No. 5,235,672 which patent is assigned to the assignee of this application and is entitled "HARDWARE FOR ELECTRONIC NEURAL NETWORK."

The NPM 100 of FIG. 2 is also a general purpose chip that may be used in a variety of applications because the digital weights are controlled off-chip. The NPM 100 is particularly suited to a pattern recognition, however, because it can rapidly perform "inner product" convolution with a plurality of image permutations and a pre-existing template of weights. Accordingly, the remainder of this specification will describe the preferred NPM 100 with an emphasis on pattern recognition.

PATTERN RECOGNITION

In a pattern recognition system, the periodic input signals are image signals 110 that are obtained from an external image source ISO such as a photosensor array, or a video signal, and the weights correspond to an image "template" that the system tries to locate within the image data. The periodic image signals generally arrive in frames that are refreshed at a fixed frequency that is relatively slow when compared to the calculation capability of the synapse array 200.

The purpose of this invention is to maximize the use of the synapse array 200. If the synapse array 200 were provided with only one set of image signals per frame in an ordinary manner, it would accomplish its arithmetic task almost immediately and then do nothing during the remainder of each successive frame. The synapse array 200 has a dramatic amount of "free time." The present invention takes advantage of the free time by creating and using image signal permutations during each frame.

The frame rate (corresponding to the "data arrival" rate discussed above) might be as slow as 30 Hz in the case of video signals that are displayed on a conventional televisions, or as fast as 1000 Hz in the case of special photosensor circuits that are designed for commercial or military applications. In either case, the frame rate is substantially lower than the maximum calculation rate of the synapse array 200. Stated conversely, the synapse cells 201 can perform many, many calculations (products and sums) before a new image frame arrives.

Some numbers may clarify this concept. The synapse cells 201 of a typical synapse array 200 require about 250 nanoseconds ($250 \times 10^{-9}$ seconds) to multiply an analog input representing the brightness of an image pixel (voltage or current) by an analog equivalent of a digital weight (charge or voltage). An analog multiplication that takes 250 nanoseconds is very slow relative to digital multipliers, the faster of which have a latency of less than 2.6 nanoseconds. Even at such a "slow" rate, however, a synapse array 200 that is used maximally could accomplish nearly 4 million multiplies per second, or 4 Mhz, which is about 4,000 times faster than the image generated by CCD array running at 1000 Hz and is about 133,333 times faster than the 30 Hz frame rate of an image generated by a television broadcast and.

Figure 3:
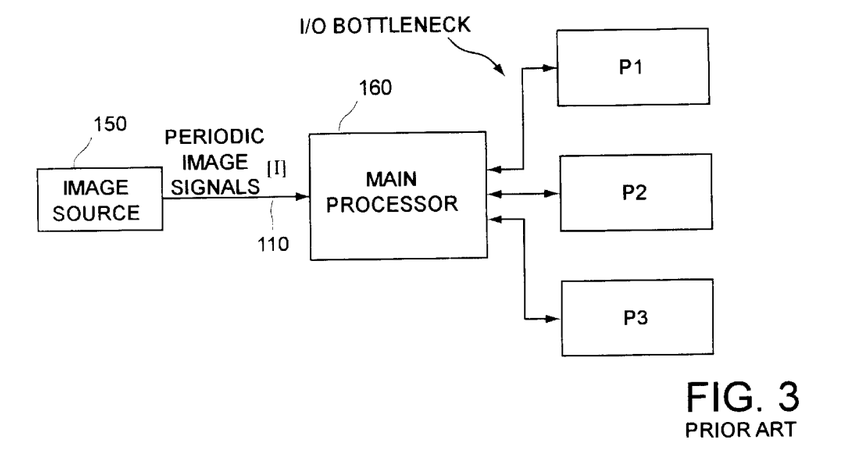
FIG. 3 is a block diagram of a conventional pattern recognition system.

FIG. 3 is a block diagram of a conventional system that clarifies the benefits of using the present invention in the context of pattern recognition system. In this case, periodic image signals from an external image source 150 are provided to a main processor 160 that divides the image signals into manageable components and then passes each component to one of several coprocessors P1, P2, P3 which separately endeavor to find a match. There are several problems with this approach. First, there is an I/O bottleneck because a substantial amount of data must move back and forth between the main processor 160 and the plurality of coprocessors P1, P2, P3. Second, it is not generally obvious how to divide the image, the template, or both. The system may literally split up the "target" portion of the image and pass part to one co-processor and part to another co-processor, such that neither finds the target.

FIG. 4, on the other hand, shows a pattern recognition system which uses at least one NPM 100 according to the present invention. Here, the NPM 100 receives the periodic image signals [I] 110 from the external image source 150 via its input switching means 300, and within the time span of a single frame, rapidly rearranges those image signals into a succession of image signal permutations, multiplies each permutation by the weights [W] that were loaded into the synapse array 200 via the weight loading means 400 under the control of an external CPU 180, sums the products together, and outputs a corresponding successions of values on one or more outputs 210 representing the quality of each correlation. A high output value 210 indicates high correlation with the template (a match) and a low output value 210 indicates low correlation with the template (no match). The input switching means 300 uniquely rearranges the incoming image signals 110 to create any desired sequence of orientations, sizes, and distortions of the data before the arrival of the next image frame. Moreover, there is no bottleneck and there is no need to divide the image.

THE PREFERRED NPM

Figure 5:
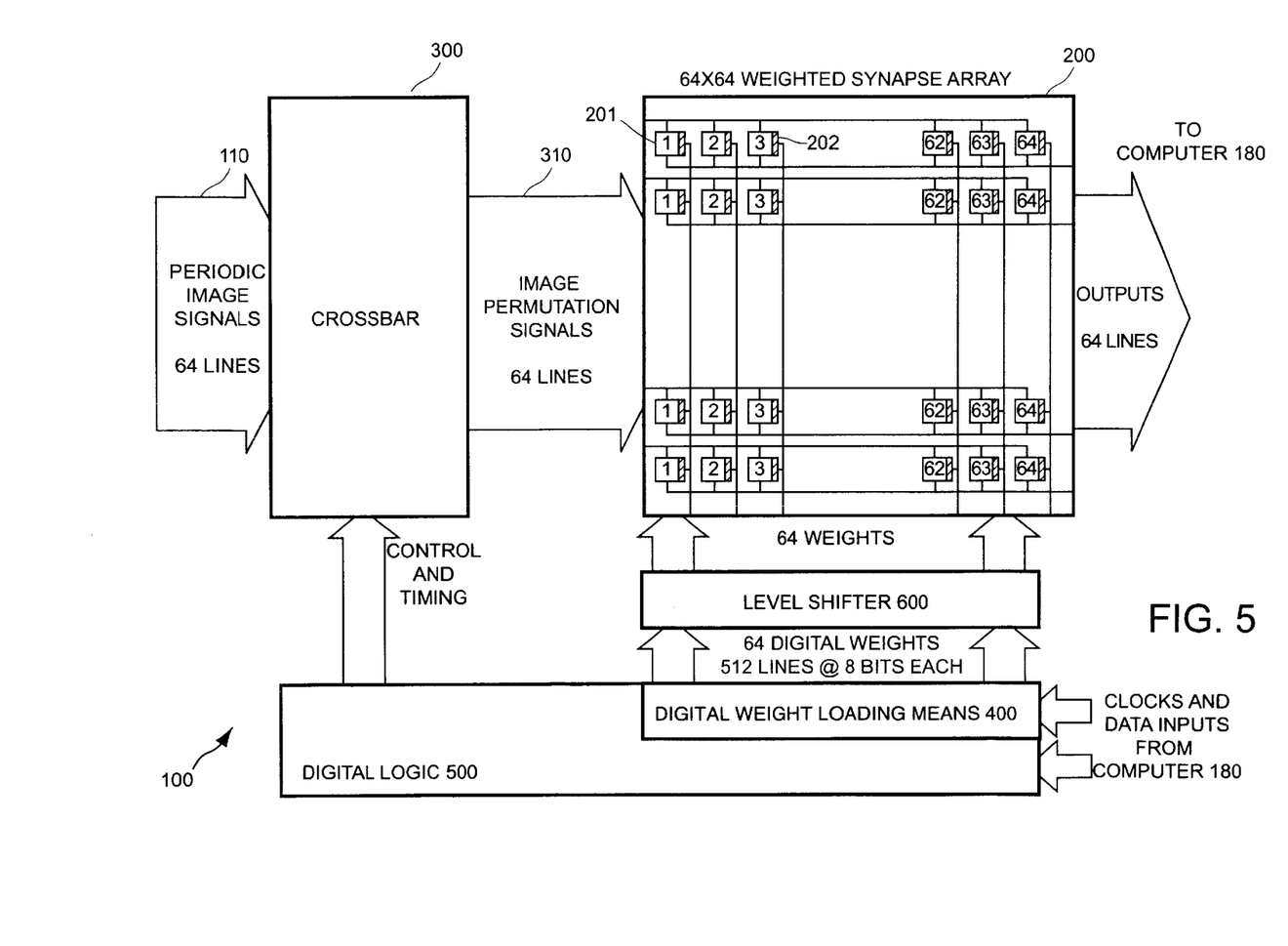
FIG. 5 shows the preferred NPM 100 for use in a pattern recognition system like that of FIG. 4.

FIG. 5 shows the preferred NPM 100 for use in a pattern recognition system like that of FIG. 4. The NPM 100 generally comprises a weighted synapse array 200, an input switching means consisting of a crossbar 300, and digital weight loading means 400.

Here, the crossbar 300 receives 64 image signals from an external image source 150 (see FIG. 4), forms a plurality of image signal permutations 310 from the 64 image signals and successively outputs such image signal permutations 310 to the synapse array 200. Digital logic 500 controls the crossbar 300 according to clocks and data received from the computer 180 or other external source. The crossbar 300 rearranges the incoming image signal at or near the calculation rate of the synapse array 200.

The digital logic 500 also contains the weight loading means 40 that loads the digital weights into the DACs 202 of the synapse cells 201 via a level shifter 600 (discussed below) in accordance with the clocks and data from the external computer 180.

Figure 6:
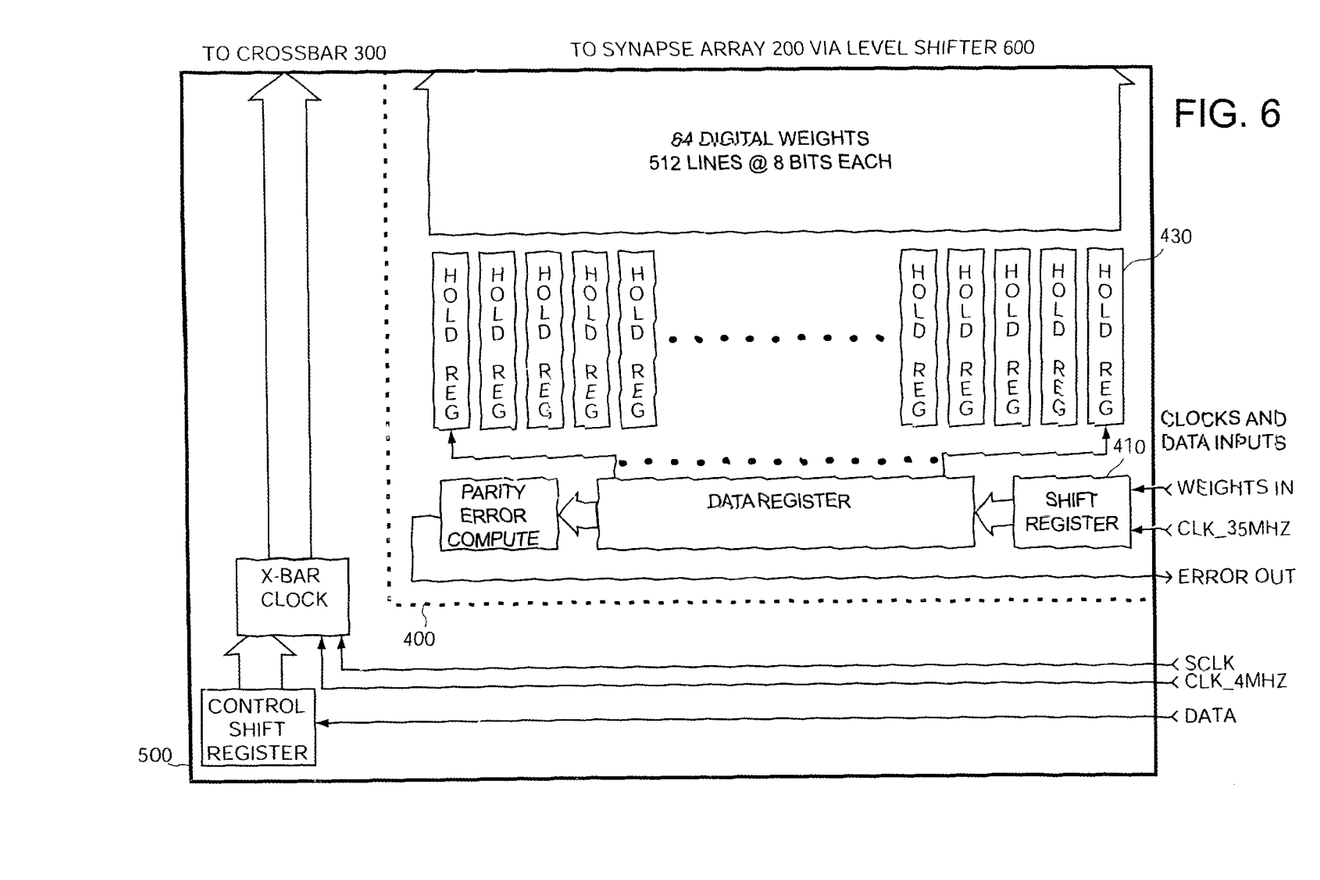
FIG. 6 is a more detailed block diagram of the digital logic 500 and weight loading means 400 of FIG. 5.

FIG. 6 is a more detailed block diagram of the digital logic 500 and weight loading means 400 of FIG. 5. In this particular case, the digital weights are 8-bits each, such that all 64 digital weights nominally require 512 bit values. The digital logic 400 absorbs the large number of bit values in smaller increments. The weight loading means 400 serially clocks in only 33 bits of digital weight data (four 8-bit weights and 1 parity bit) via a shift register 410 running at 34 MHz, latches the data into the appropriate four of the sixty-four registers 430, computes the presence or absence of a parity error. The weight loading means 400 then transfers all 64 weights to the synapse array 200 via the level shifter 600.

The level shifter 600 permits low power operation. The digital logic 500 and external computer 180 nominally run at 5 volts, but the preferred synapse array 200 operates at a relatively low voltage level of 3.3 volts so that it uses as little power as possible. The level shifter 600 simply converts the digital weights to the voltages that are suitable for the low power operation of the synapse array 200.

A common measure of system performance is "floating points operations per second" or FLOPS. Each synapse cell 201 can do 4,000,000 multiplies per second, or 4 megaFLOPS. A single NPM 100 can operate at 16 gigaFLOPS since the 64×64 synapse array 200 has 4096 synapse cells 201. (4096×4,000,000 FLOPS=16 gigaFLOPS).

PATTERN RECOGNITION SYSTEM— MULTILAYER EMBODIMENT

A plurality of the NPMs 100 may be "stacked" to form, for example, a 64×64×64 cube of synapse cells 201. This provides 262,144 synapse cells 201 for convolving a 64×64 array of image signal permutations with a 64×64 array of weights.

The 64 weights associated with the synapse array 200 of one NPM 100 can be called a "weight column". An ideal system would simultaneously update all 64 weight columns within a small fraction of an image frame. Since that was impractical, however, the preferred system updates one weight column per frame and uses the remaining 63 weight columns as part of an instantaneous template of weights that are actively convolved with the 64×64 array of incoming image signal permutations. It is possible to find a correlation with only 63 of 64 weight columns because of the fault tolerant aspects of a neural network.

Since the 64 synapse arrays 200 reside in 64 adjacent layers, the output(s) provided at the edges of the adjacent synapse arrays 200 must be bused together off-chip. The preferred synapse arrays 200 have 64 distinct outputs rather than one combined output to provide more generality. In such case, the 64 distinct outputs of each array 200 are connected to 64 intermediate buses that run transversely to the edges of the adjacent synapse arrays 200, and the 64 intermediate busses are connected to a final bus that runs parallel to the edges of the adjacent synapse arrays 200 to form a final output.

A stack of 64 NPMs 100 can perform as many as 1 trillion floating point operations per second (1 "teraFLOP") since a 64×64×64 array has 262,144 synapse cells 201 that can each perform four million FLOPS, or multiplies per second (262,144×4,000,000 FLOPS=1 teraFLOP).

We claim:

1. An electronic neural processing module for convolving a first group of signals with a second group of signals, comprising:
    means for receiving a first group of signals;
    switching means for receiving a second group of signals and for creating successive groups of permutated signals from the second group of signals before a next group of second signals arrives;
    analog multiplying means for simultaneously multiplying each signal in the first group of signals with each signal in each successive group of permutated signals to form a plurality of products; and
    means for accumulating the plurality of products to produce a convolution output.

2. The neural processing module of claim 1 wherein the first group of signals comprise weights.

3. The neural processing module of claim 2 wherein the weights are digital weights.

4. The neural processing module of claim 3 wherein the analog multiplying means includes means for converting each digital weight to an analog value before performing the analog multiplication.

5. The neural processing module of claim 1 wherein the second group of signals comprise periodic input signals that are presented to the switching means at an arrival rate.

6. The neural processing module of claim 5 wherein the means for simultaneously multiplying comprises a synapse array that operates at a calculation rate that exceeds the arrival rate.

7. The neural processing module of claim 6 wherein the synapse array is an N×N array of synapse cells.

8. The neural processing module of claim 5 wherein the periodic input signals are image signals and wherein the arrival rate corresponds to a frame rate.

9. The neural processing module of claim 1 wherein the switching means is a crossbar.

10. An electronic neural network image recognition system comprising:
    means for receiving a plurality of weights;
    means for receiving successive groups of image signals at a predetermined frame rate;
    switching means for creating successive groups of image permutation signals from each group of image signals before receiving a subsequent group of image signals;
    a weighted synapse array of analog synapse cells that simultaneously perform a plurality of calculations at a calculation rate, wherein the calculation rate is greater than the frame rate, the plurality of calculations comprising the multiplying of each weight with each signal in each group of image permutation signals to form a plurality of products; and
    means for summing the plurality of products to produce a convolution output with a value that represents a correlation quality between the weights and each successive group of image permutation signals.

11. The electronic neural network image recognition system of claim 10 wherein the switching means operates a switching rate that is substantially equal to the calculation rate in order to produce as many successive groups of image permutation signals as possible.

12. The electronic neural network image recognition system of claim 10 wherein the weights are digital weights and wherein the means for receiving the weights comprises means for converting the digital weights to analog values.

13. The electronic neural network image recognition system of claim 10, further comprising a second weighted synapse array of analog synapse cells that simultaneously perform a plurality of calculations at a calculation rate, wherein the calculation rate is greater than the frame rate, the plurality of calculations comprising the multiplying of each weight with each signal in each group of image permutation signals to form a plurality of products.

14. The electronic neural network image recognition system of claim 10 contained on an IC chip.

15. The electronic neural network image recognition system of claim 14 wherein the weighted synapse array has a two dimensional N×N array of analog synapse cells.

16. The electronic neural network image recognition system of claim 14 further comprising a plurality of IC chips that each include a weighted synapse array having a two dimensional N×N array of analog synapse cells, the chips being stacked in a cube-like arrangement to form a three dimensional N×N×N array of synapse cells.

17. The electronic neural network image recognition system of claim 16 wherein less than all of the means for receiving weights on the chips are operated in order to update less than all of the corresponding weights during any one frame.

* * * * *